US007155387B2

(12) United States Patent
Globerson

(10) Patent No.: US 7,155,387 B2
(45) Date of Patent: Dec. 26, 2006

(54) NOISE SPECTRUM SUBTRACTION METHOD AND SYSTEM

(75) Inventor: Amir Globerson, Rehovot (IL)

(73) Assignee: Art - Advanced Recognition Technologies Ltd., Tel Aviv (IL)

( * ) Notice: Subject to any disclaimer, the term of this patent is extended or adjusted under 35 U.S.C. 154(b) by 95 days.

(21) Appl. No.: 09/755,131

(22) Filed: Jan. 8, 2001

(65) Prior Publication Data

US 2002/0123886 A1 Sep. 5, 2002

(51) Int. Cl.
*G10L 21/02* (2006.01)
*G10L 19/10* (2006.01)
*G10L 19/14* (2006.01)
*H04B 15/00* (2006.01)

(52) U.S. Cl. ........................ 704/226; 704/219; 704/205; 381/94.3

(58) Field of Classification Search ................. 704/253, 704/226, 219, 210, 205; 381/94.3
See application file for complete search history.

(56) References Cited

U.S. PATENT DOCUMENTS 6,003,004 A * 12/1999 Hershkovits et al. ....... 704/253

OTHER PUBLICATIONS

Kimura, S., Advances in Speech Recognition Technologies, Dec. 1999, Fujitsu Sci. Tech. J. 35, 2, pp. 202–211.*

Zhao et al., Improvement in LPC Analysis of Speech by Noise Compensation, Nov. 1998, Trans. of the IEICE A vol. J81-A, No. 11, pp. 1538–1591 (Translation included).*

S.F. Boll, "Suppression of Acoustic Noise in Speech Using Spectral Subtraction", *IEEE Transactions on Acoustics, Speech and Signal Processing*, Apr. 1979, p. 113–120, vol. 27, n. 2.

L. Rabiner et al., *Fundamentals of Speech Recognition*, 1993, p. 97–121, Prentice Hall, Englewood Cliffs, New Jersey.

A.V. Oppenheim et al., *Digital Signal Processing*, 1975, p. 557–559, Prentice Hall, Englewood Cliffs, New Jersey.

* cited by examiner

*Primary Examiner*—Vijay Chawan
*Assistant Examiner*—V. Paul Harper
(74) *Attorney, Agent, or Firm*—Bromberg & Sunstein LLP

(57) ABSTRACT

A method for reducing noise in a voice signal, and a voice operated system utilizing the same are presented. A noise component in a compressed digital signal representative of the voice signal is determined, and subtracted from the compressed digital signal.

6 Claims, 2 Drawing Sheets

NOISE SPECTRUM SUBTRACTION METHOD AND SYSTEM

FIELD OF THE INVENTION

This invention is in the field of noise subtraction techniques, and relates to a noise spectrum subtraction method and a voice-processing unit utilizing the same for use in a voice operated system.

BACKGROUND OF THE INVENTION

Voice operated systems are typically utilized in communication devices, such as phone devices and computers, as well as in toys. These systems typically comprise such main constructional components as an A/D converter for receiving an input analog voice signal, a vocoder, an operating system, a communication interface associated with an output port, and a voice recognizer (typically implemented as a separate DSP chip).

During a transmission operational mode of the communication device (e.g., mobile phone), the input analog voice signals (e.g., generated by a microphone) are digitized by the converter. In the conventional devices, the digitized voice signals are supplied to the vocoder for compression of the voice samples to reduce the amount of data to be transmitted through the interface unit to another communication device (e.g., mobile phone), and are concurrently supplied to the voice recognizer. The latter receives the digitized voice samples as input, parameterizes the voice signal and matches the parameterized input signal to reference voice signals. The voice recognizer typically either provides the identification of tie matched signal to the operating system, or, if a phone number is associated with the matched signal, provides the associated phone number.

A technique utilizing the application of a voice recognition function to a compressed digitized signal has been developed and disclosed in U.S. Pat. No. 6,003,004 assigned to the assignee of the present application.

It is a well-known problem of voice operated systems that background noise added to speech can degrade the performance of digital voice processors used for speech compression, recognition, authentication, etc. Thus, to improve the quality of voice recognition, it is necessary to reduce the background noise in a speech signal.

Various noise reduction techniques have been developed and disclosed, for example, in the article S. F. Boll "*Suppression of Acoustic Noise in Speech Using Spectral Subtraction*", IEEE Transactions in Acoustics, Speech and Signal processing, 1979, V. 27, N. 2, pp. 113–120. According to the known techniques, the noise suppression of the digital signal is typically carried out before the signal is supplied to the vocoder (i.e., prior to signal compression). This approach is therefore computationally intensive and slow. This is a serious drawback when dealing with mobile phones, since the processing requirements of noise suppression and voice recognition pose a severe processing load on the mobile phone and may obstruct its operation. It is known to use an additional DSP chip for noise suppression.

SUMMARY OF THE INVENTION

There is therefore a need in the art to facilitate noise reduction in voice operated systems by providing a novel noise specimen subtraction method and a voice processing unit utilizing the same.

The main idea of the present invention consists of applying a noise reduction to a digital signal representative of a voice signal, after the digital signal being compressed. This simplifies the computation.

There is thus provided according to one aspect of the present invention, a method for reducing noise in a voice signal, the method comprising the steps of:

(i) processing a compressed digital signal representative of the voice signal including a speech component and a noise component; and (ii) determining the noise component to be subtracted from the compressed digital signal.

In a preferred embodiment of the invention, the compressed digital signal is based on a set of linear prediction coding (LPC) coefficients and a residual signal, and is obtained by applying LPC analysis to the voice signal. To this end, a digital signal may be divided into a series of frames representative of the voice signal including a speech component and a noise component to be subtracted. The frame may, for example, represent about 20 msec of the digital signal. Preferably, the frame is composed of M digitized speech samples, and the set of LPC coefficients contains p coefficients, such that die ratio p/M is in the range of 0.1–0.25. LPC analysis is applied to all frames, thereby obtaining the compressed digital signal representative of the voice signal.

Preferably, the processing of the compressed digital signal is based on the following: determination of a power spectrum of the noise component during a non-speech activity and calculation of its average value, calculation of a power spectrum estimator of the compressed digital signal with a reduced noise component, determination of an autocorrelation function of this signal, and determination of modified LPC coefficients. The modified LPC coefficients represent the speech component with the reduced noise spectrum. To determine the noise spectrum, a calculation involving a Fourier transform can be applied to the compressed digital signal. To determine the autocorrelation function of the compressed digital signal with the reduced noise component, an inverse Fourier transform may be applied to the estimated power spectrum of the signal with the reduced noise component.

According to another aspect of the present invention, there is provided a voice processing unit for use in a voice operated system, the voice processing unit comprising a noise reduction utility interconnected between a voice coding utility and a voice recognition utility, the noise reduction utility being operable for processing a compressed digital signal representative of an input voice signal received from the voice coding utility and generating an output compressed digital signal with reduced noise spectrum.

According to yet another aspect of the present invention, there is provided a voice operated system comprising an input port for receiving an input voice signal, an analog-to-digital converter for processing the input signal to generate a digital output indicative thereof, a voice processing utility for processing the digital signal and generating a compressed digital signal representative of the input voice signal, a voice processing unit, a system interface utility, and a control module, which is interconnected between the voice processing utility and the voice processing unit, and is connected to the system interface to operate it in response to a speech signal, the voice processing unit comprising:

a noise reduction utility coupled to the voice processing utility and operable to process said compressed digital signal and generate an output compressed digital signal with reduced noise spectrum; and a voice recognition utility coupled to the noise reduction utility for processing said output compressed digital signal with reduced noise spectrum.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
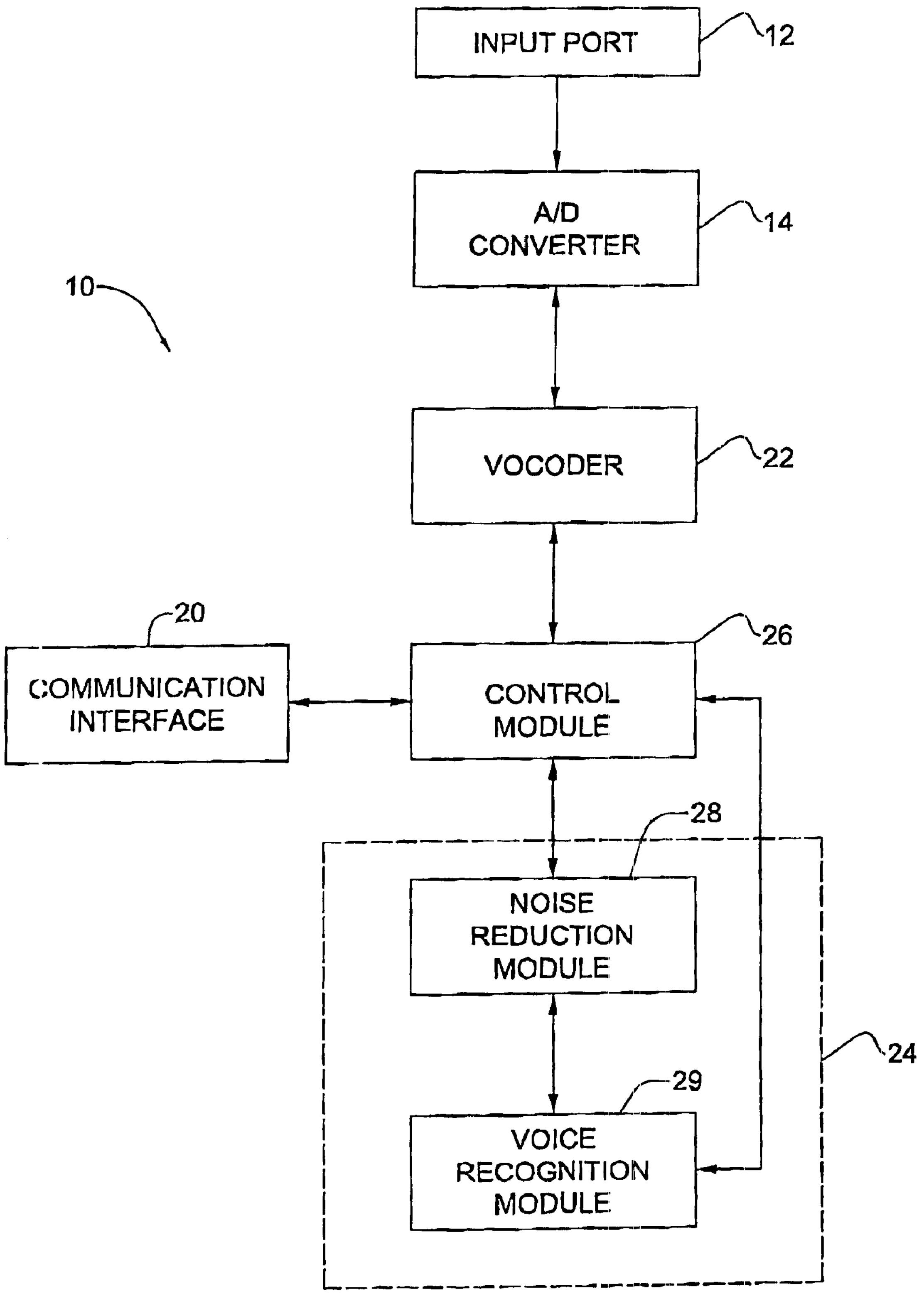
FIG. 1 is a block diagram of a voice operated system according to the invention.

Referring to FIG. 1, there are illustrated the main components of a voice operated system 10 according to the invention (e.g., a mobile phone device). These components include the following: an A/D converter 14 for receiving an analog voice signal coming from an input port 12 (e.g., a microphone), a system interface utility 20 associated with an output port (not shown), a voice processing utility (vocoder) 22, a voice processing unit 24, and a control unit (module) 26, which is interconnected between the vocoder 22 and the voice processing unit 24, and is connected to the system interface utility 20. The voice processing unit 24 comprises a noise reduction utility 28 coupled to the vocoder 22 through the control unit 26, and a voice recognition utility 29 coupled to the noise reduction utility 28.

Figure 2:
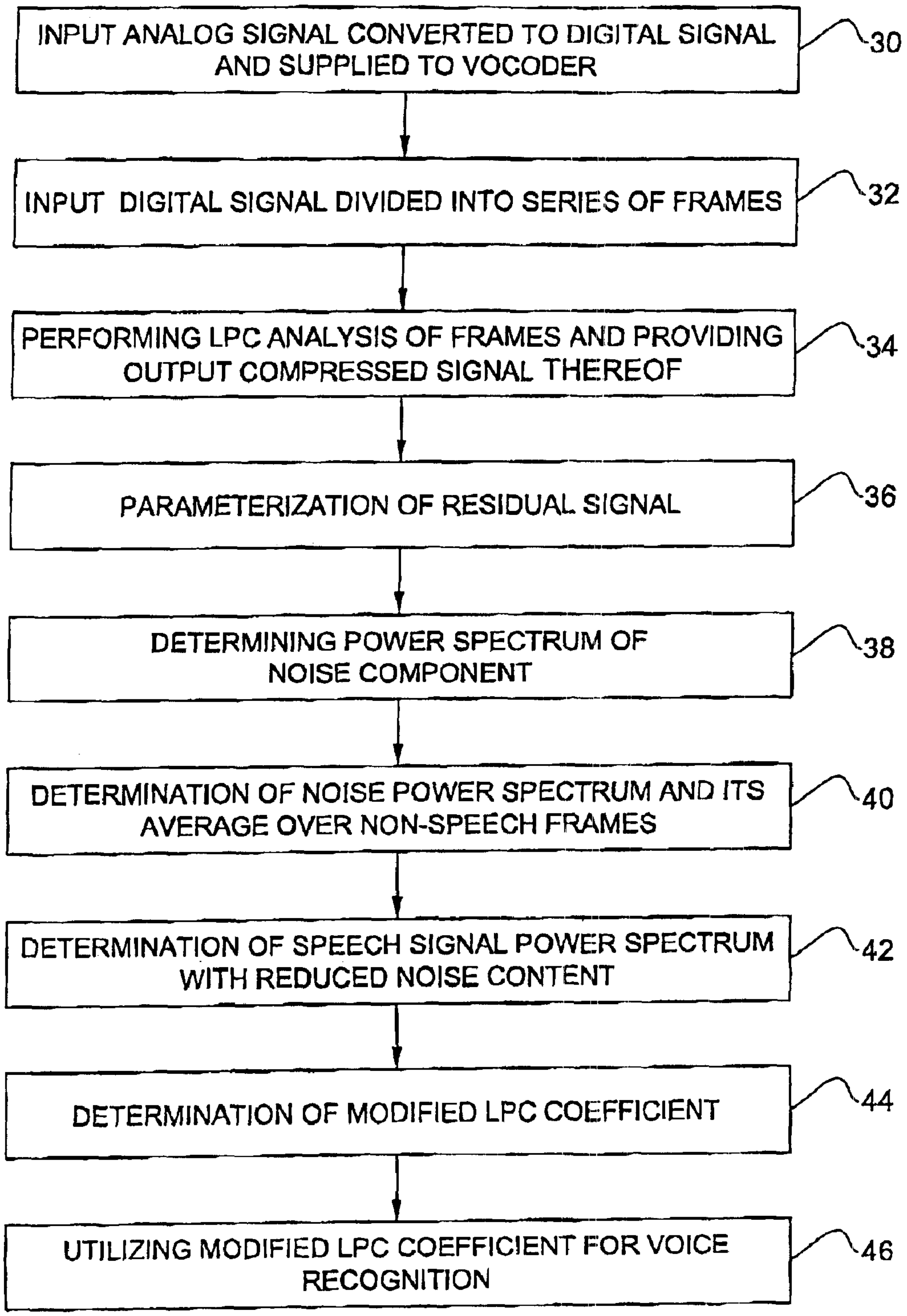
FIG. 2 is a flow chart of main operational steps of a voice processing unit of the system of FIG. 1.

The operation of the system 10 will now be described with reference to FIG. 2. Initially, the A/D converter 18 converts the input analog voice signal into an output digital signal, and supplies the digital output to the vocoder 22 (step 30). The vocoder 22 is operable by suitable software to compress the digital signal.

In the present example, a voice compression algorithm based on LPC analysis is utilized. It should, however, be noted that any other suitable technique can be used for digital signal compression, for example, the voice quantization technique.

Thus, in the present example, to compress the input digital signal, it is divided into a series of frames (step 32). Each frame contains M samples x(m), where m=1,2,3, . . . , M, and typically represents 20 msec of the input signal.

The signal x(m) is typically a sum of a speech signal component, s(m), and a stationary additive background noise component, n(m), which is to be reduced, that is:

$$x(m)=s(m)+n(m) \tag{1}$$

The vocoder performs LPC analysis on each frame and provides an output compressed signal thereof (step 34). Generally, the LPC analysis can be applied to at least some samples of at least one frame.

As a result, the given signal sample x(m) is represented in the following form:

$$x(m)=\sum_{i=1}^{p} a_i x(m-i)+\varepsilon(m)=\sum_{i=1}^{p} a_i[s(m-i)+n(m-i)]+\varepsilon(m) \tag{2}$$

wherein $\alpha_i$ are the LPC coefficients and $\epsilon$(m) is a residual signal, all being the parameters of the frame. Each frame has LPC coefficients $\alpha_i$.

The vocoder further parameterizes the residual signal $\epsilon$(m) in terms of at least pitch and gain values (step 36).

The above coding scheme usually results in a compression factor of approximately 8–11. The output of the vocoder 22 is supplied to the noise reduction utility 26 through the control module 26. The noise reduction utility is operable to determine a power spectrum of the noise component during a non-speech activity (step 38), and to remove the power spectrum of the noise component from the noisy speech signal. In the present example, the power spectrum of a signal x(m) is denoted by $|X(\omega_m)|^2$ and is calculated as follows:

$$X(\omega_m)=S(\omega_m)+N(\omega_m)=H(\omega_m)\cdot E(\omega_m) \tag{3}$$

$$H(\omega_m)=\frac{1}{1+\sum_{i=1}^{p} a_k\cdot e^{-j\omega_m k}}$$

$$|X(\omega_m)|^2=|H(\omega_m)|^2|E(\omega_m)|^2$$

wherein $S(\omega_m)$, $N(\omega_m)$ and $E(\omega_m)$ are Fourier transforms of s(m), n(m) and $\epsilon$(m), respectively. It should be noted that, for non-speech frames, $X(\omega_m)=N(\omega_m)$.

In the present invention, it is assumed that the power spectrum of $\epsilon$(m) is constant, i.e., $|E(\omega_m)|^2=E_0^2$. By using Parseval theorem, the value of $E_0^2$ can be estimated as follows:

$$E_0^2=\frac{1}{M}\sum_{m=1}^{M}|E(\omega_m)|^2=\frac{1}{M}\sum_{m=1}^{M}\varepsilon(m)^2 \tag{4}$$

The noise reduction utility determines the noise power spectrum $|N(\omega_m)|^2$ during the non-speech activity and calculates its average value $<|N(\omega_m)|^2>$ over non-speech frames (step 40), as follows:

$$<|N(\omega_m)|^2>=\mu(\omega_m) \tag{5}$$

Using the above expressions, the noise reduction utility 28 determines the speech signal power spectrum estimator $\hat{S}(\omega_m)$ with reduced noise component (step 42), as follows:

$$\hat{S}(\omega_m)=|H(\omega_m)|^2\cdot E_0^2-\mu(\omega_m) \tag{6}$$

In equation (6), all the $\hat{S}(\omega_m)$ samples which are less than zero are replaced by zeros (clipping condition). It should be noted that $\hat{S}(\omega_m)$ is advantageously based only on p LPC coefficients $\alpha_i(p<<M)$ and on the total energy of the residual signal.

As known, for example, from the disclosure in the following book: A. V. Oppenhein et al., *"Digital Signal Processing"*, Prentice Hall, Inc., Englewood Cleef, NI, 1975, p. 557, the inverse Fourier transform of $\hat{S}(\omega_m)$ is the autocorrelation function r(n) of the signal, that reads:

$$r(n)=\frac{1}{M}\sum_{m=1}^{M}\hat{S}(\omega_m)\cdot e^{i\omega_m n}=\sum_{m=1}^{M}s(m)\cdot s(m-n) \tag{7}$$

Based on the above equation, the noise reduction utility 28 determines modified LPC coefficients $\hat{\alpha}_k$ (step 44). To implement this, any known suitable technique can be used, for example, those disclosed in the book: Rabiner et al., *"Fundamentals of Speech Recognition"*, Prentice Hall, 1993, pp 97–121. The modified LPC coefficients $\hat{\alpha}_k$ represent the compressed digital signal with the reduced noise component.

Thus, the noise recognition utility determines the modified LPC coefficients, generates an output compressed digital signal indicative thereof, and supplies this signal to the voice recognition utility 29, which utilizes the same for performing the voice recognition.

It should be noted that the noise reduction utility 28 can also produce various LPC based parameters, such as cepstrum coefficients, MEL cepstrum coefficients, line spectral pairs (LSPs), reflection coefficients, log area ratio (LAR) coefficients, and the like.

Those skilled in the art will readily appreciate that various modifications and changes can be applied to the preferred embodiment of the invention as hereinbefore exemplified without departing from its scope defined in and by the appended claims. For example, any suitable technique can be used to determine modified LPC coefficients. The voice operated system utilizing the voice processing unit according to the invention may be of any suitable type, other than the mobile phone device described above.

What is claimed is:

1. A method for reducing noise in a voice signal, the method comprising:

(a) processing a digital signal representative of the voice signal including a speech component and a noise component, said processing comprising applying linear prediction coding (LPC) analysis to said digital signal thereby obtaining a compressed digital signal representative of said voice signal; and (b) processing the compressed digital signal for determining a power spectrum of the noise component, thereby enabling to subtract the noise component from the compressed digital signal.

2. The method according to claim 1, wherein said compressed digital signal is based on a set of (LPC) coefficients and a residual signal, said processing comprising parameterization of the residual signal.

3. The method according to claim 2, wherein the processing of the compressed digital signal comprises:

carrying out said determining of the power spectrum of the noise component of said compressed digital signal during a non-speech activity, and calculating its average value;

calculating a power spectrum estimator of the compressed digital signal with a reduced noise component;

determining an autocorrelation function of the compressed digital signal with the reduced noise component; and determining a set of modified LPC coefficients from the autocorrelation function.

4. A method for processing a voice signal to reduce a noise therefrom, the method comprising:

(a) providing a digital signal representative of said voice signal including a speech component and a noise component;

(b) applying linear prediction coding (LPC) analysis to the digital signal, thereby obtaining a compressed digital signal representative of said voice signal, wherein said compressed digital signal is based on a set of LPC coefficients and a residual signal;

(c) determining a power spectrum of the noise component during a non-speech activity, and calculating its average value;

(d) calculating a power spectrum estimator of the compressed digital signal with reduced noise component;

(e) determining an autocorrelation function of the compressed digital signal with the reduced noise component; and (f) determining modified LPC coefficients representing the speech component with reduced noise spectrum from the autocorrelation function.

5. A voice processing unit for use in a voice operated system, the voice processing unit comprising a noise reduction utility interconnected between a voice coding utility and a voice recognition utility, the voice coding utility being configured and operable to process a digital signal representative of an input voice signal, including a speech component and a noise component, by applying linear prediction coding (LPC) analysis to said digital signal thereby obtaining a compressed digital signal representative of said input voice signal, the noise reduction utility being configured and operable for receiving the compressed digital signal, processing it to determine a power spectrum of the noise component, and generating an output compressed digital signal with reduced noise spectrum.

6. A voice operated system comprising: an input port for receiving an input voice signal; an analog-to-digital converter for processing the input signal to generate a digital output indicative thereof; a voice processing utility for processing the digital signal by applying thereto linear prediction coding (LPC) analysis and generating a compressed digital signal, representative of the input voice signal, said compressed digital signal being in the form of a set of LPC coefficients and a residual signal; a voice processing unit; a system interface utility; and a control module, which is interconnected between the voice processing utility and the voice processing unit, and is connected to the system interface to operate it in response to a speech signal; the voice processing unit comprising:

a noise reduction utility coupled to the voice processing utility for processing said compressed digital signal to determine a power spectrum of the noise component, and generating an output compressed digital signal with reduced noise spectrum; and a voice recognition utility coupled to the noise reduction utility for processing said output compressed digital signal with reduced noise spectrum.

* * * * *

UNITED STATES PATENT AND TRADEMARK OFFICE

CERTIFICATE OF CORRECTION

PATENT NO. : 7,155,387 B2
APPLICATION NO. : 09/755131
DATED : December 26, 2006
INVENTOR(S) : Amir Globerson It is certified that error appears in the above-identified patent and that said Letters Patent is hereby corrected as shown below:

Col. 5, line 31
replace "set of (LPC) coefficients"
with --set of LPC coefficients--.

Signed and Sealed this

Sixth Day of March, 2007

JON W. DUDAS
*Director of the United States Patent and Trademark Office*